United States Patent
Langadi et al.

(10) Patent No.: US 11,593,110 B2
(45) Date of Patent: Feb. 28, 2023

(54) INSTRUCTION PACKING SCHEME FOR VLIW CPU ARCHITECTURE

(71) Applicant: TEXAS INSTRUMENTS INCORPORATED, Dallas, TX (US)

(72) Inventors: Saya Goud Langadi, Bangalore (IN); Venkatesh Natarajan, Karnataka (IN); Alexander Tessarolo, Lindfield (AU)

(73) Assignee: Texas Instruments Incorporated, Dallas, TX (US)

( * ) Notice: Subject to any disclaimer, the term of this patent is extended or adjusted under 35 U.S.C. 154(b) by 234 days.

(21) Appl. No.: 17/143,989

(22) Filed: Jan. 7, 2021

(65) Prior Publication Data
US 2022/0214880 A1 Jul. 7, 2022

(51) Int. Cl.
*G06F 9/30* (2018.01)
*G06F 9/38* (2018.01)
*G06F 9/48* (2006.01)

(52) U.S. Cl.
CPC ........ *G06F 9/30152* (2013.01); *G06F 9/3851* (2013.01); *G06F 9/4843* (2013.01)

(58) Field of Classification Search
CPC ............. G06F 9/30152; G06F 9/30149; G06F 9/30145
See application file for complete search history.

(56) References Cited

U.S. PATENT DOCUMENTS

| 5,586,277 | A | * | 12/1996 | Brown | G06F 9/30152 712/210 |
| 5,758,116 | A | * | 5/1998 | Lee | G06F 9/30152 712/210 |
| 10,318,293 | B2 | * | 6/2019 | Anderson | G06F 9/3867 |
| 2014/0223142 | A1 | | 8/2014 | Kageyama et al. | |
| 2016/0048394 | A1 | | 2/2016 | Vorbach et al. | |
| 2017/0300334 | A1 | | 10/2017 | Kharitov et al. | |
| 2018/0143832 | A1 | * | 5/2018 | Nield | G06F 8/443 |
| 2019/0155605 | A1 | | 5/2019 | Bui et al. | |

OTHER PUBLICATIONS

International Search Report for PCT/US2022/011525 dated Apr. 7, 2022.

* cited by examiner

*Primary Examiner* — William B Partridge
(74) *Attorney, Agent, or Firm* — Brian D. Graham; Frank D. Cimino

(57) ABSTRACT

A processor is provided and includes a core that is configured to perform a decode operation on a multi-instruction packet comprising multiple instructions. The decode operation includes receiving the multi-instruction packet that includes first and second instructions. The first instruction includes a primary portion at a fixed first location and a secondary portion. The second instruction includes a primary portion at a fixed second location between the primary portion of the first instruction and the secondary portion of the first instruction. An operational code portion of the primary portion of each of the first and second instructions is accessed and decoded. An instruction packet including the primary and secondary portions of the first instruction is created, and a second instruction packet including the primary portion of the second instruction is created. The first and second instructions packets are dispatched to respective first and second functional units.

20 Claims, 3 Drawing Sheets

INSTRUCTION PACKING SCHEME FOR VLIW CPU ARCHITECTURE

BACKGROUND

In a very long instruction word (VLIW) central processing unit (CPU), instructions are grouped into execute packets including multiple instructions. The instructions within the packet can be of variable sizes. An iterative scheme can be used to identify and decode each separate instruction. Each instruction may include a size portion and an operational code (opcode) portion. A decoding scheme may iterate through each instruction to determine its size in order to determine the size of the opcode portion to be decoded. The entire opcode portion is then decoded to determine what type of instruction it is and where it is to be routed for further processing. After decoding the instruction, the next instruction is located and examined in a similar manner to decode its opcode portion.

SUMMARY

In accordance with one aspect, a processor includes a core that is configured to perform a decode operation on a multi-instruction packet including multiple instructions. The decode operation includes receiving the multi-instruction packet that includes a first instruction that includes a primary portion at a fixed first location and a secondary portion and a second instruction that includes a primary portion at a fixed second location between the primary portion of the first instruction and the secondary portion of the first instruction. The decode operation also includes accessing the primary portion of the first instruction, decoding an operational code (opcode) portion of the primary portion of the first instruction, and accessing the primary portion of the second instruction. The decode operation also includes decoding an opcode portion of the primary portion of the second instruction, creating a first instruction packet comprising the primary portion of the first instruction and the secondary portion of the first instruction, and creating a second instruction packet comprising the primary portion of the second instruction. The decode operation further includes dispatching the first instruction packet to a first functional unit and dispatching the second instruction packet to a second functional unit distinct from the first functional unit.

In accordance with another aspect, a method implemented on a processor core includes receiving a first multi-instruction packet that includes a primary portion of a first instruction at a fixed first location, a primary portion of a second instruction at a fixed second location that follows the fixed first location, and a secondary portion of the first instruction that follows the primary portion of the second instruction. The method also includes decoding an operational code (opcode) portion of a primary portion of a first instruction in a first multi-instruction packet, the primary portion of the first instruction located at a fixed first location within the first multi-instruction packet. The method also includes decoding an operational code ("opcode") portion of the primary portion of the first instruction, decoding an opcode portion of the primary portion of the second instruction, and accessing the secondary portion of the first instruction. The method further includes creating a first instruction packet comprising the primary and secondary portions of the first instruction and respectively dispatching the first instruction packet and the second instruction to distinct functional units.

DETAILED DESCRIPTION

Figure 1:
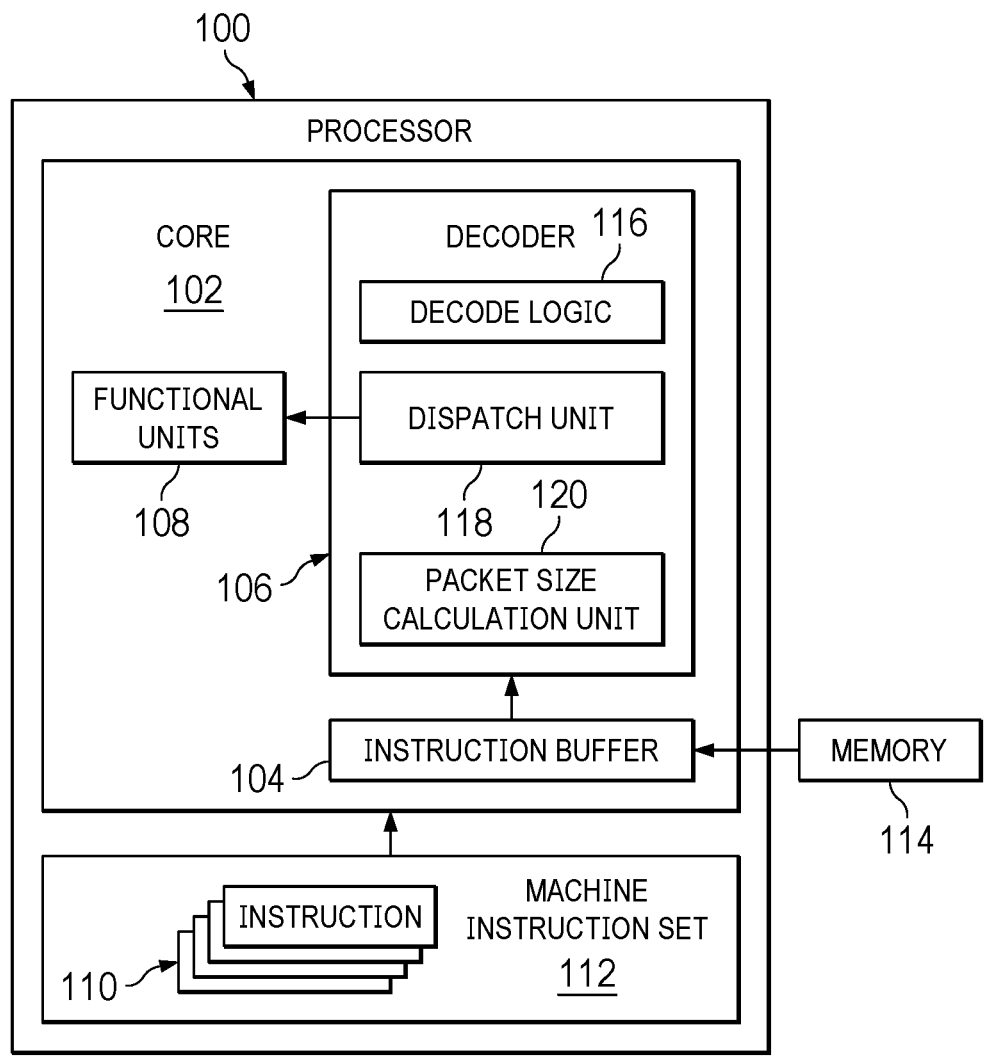
FIG. 1 is a block diagram of a processor for receiving, decoding, and dispatching instructions according to an example.

FIG. 1 shows a block diagram of a central processing unit or processor 100 in accordance with an example. The processor 100 as shown includes a core 102, which contains a prefetch instruction buffer 104, a decoder 106, and one or more functional units 108 such as comparators, control units, arithmetic logic units (ALUs), and the like. The core 102 may contain other hardware components as well such as subtractors, fetch logic, and the like. The core 102 may execute various machine instructions 110 of an instruction set 112, which may be stored in memory within, or otherwise accessible to, the core 102. The machine instructions 112 comprise an instruction set that includes a variety of operations to be performed. During the course of executing a program, the instruction buffer 104 can receive instruction packets from memory 114 external to the processor 100.

Decoder 106 includes decode logic 116 that decodes each instruction packet as described herein. Following the decode, a dispatch unit 118 sends each instruction to its designated functional unit for carrying out the instruction. In one example, processor 100 operates as a very long instruction word (VLIW) processor capable of operating on plural instructions in corresponding functional units simultaneously. Preferably, a compiler organizes instructions in multi-instruction packets that are executed together. Instruction dispatch unit 118 directs each instruction to its target functional unit 108. In an example, instruction dispatch unit 118 may operate on plural instructions in parallel such as having at least a portion of each instruction processed simultaneously. The number of such parallel instructions may be set by the number of instructions within the multi-instruction packet. A packet size calculation unit 120 keeps track of each instruction packet transferred from the instruction buffer 104.

Figure 2:
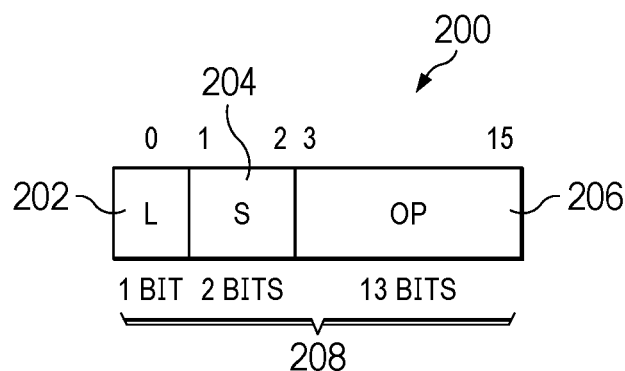
FIG. 2 is a block diagram illustrating a 16-bit CPU instruction according to an example.

FIG. 2 illustrates a CPU instruction 200 having a 16-bit format according to an example. Instruction 200 includes a link portion 202 having 1 bit, a size portion 204 having 2 bits, and an opcode portion 206 having 13 bits. The link portion 202 indicates whether the instruction 200 is the last instruction in an instruction packet of multiple instructions or whether there are additional instructions in the instruction packet that follow the instruction 200. For example, a value of 0b1 (e.g., a single bit of binary value 1) may indicate that there is at least one additional instruction following the current instruction in the packet while a value of 0M may indicate that the current instruction is the last instruction in the packet or vice versa. The size portion 204 indicates the size of the instruction 200. In an instruction set where the instructions 110 can be one of multiple sizes (e.g., one of three sizes: 16 bits, 32 bits, or 48 bits), the size portion 204 may be, for example, two bits to indicate the size of the current instruction. In an example, a bit code of 0b00 may indicate that the instruction size is 16 bits, 0b01 may indicate that the instruction size is 32 bits, and 0b10 may indicate that the instruction size is 48 bits. Other implementations are also possible. Opcode portion 206 includes the operational code that provides the instruction(s) intended to be carried out by the instruction 200 and includes any additional information tied to the opcode such as an operand. Together, the portions 202, 204, 206 occupy the 16 bits of the instruction 200 and form a primary portion 208 of the instruction 200.

Figure 3:
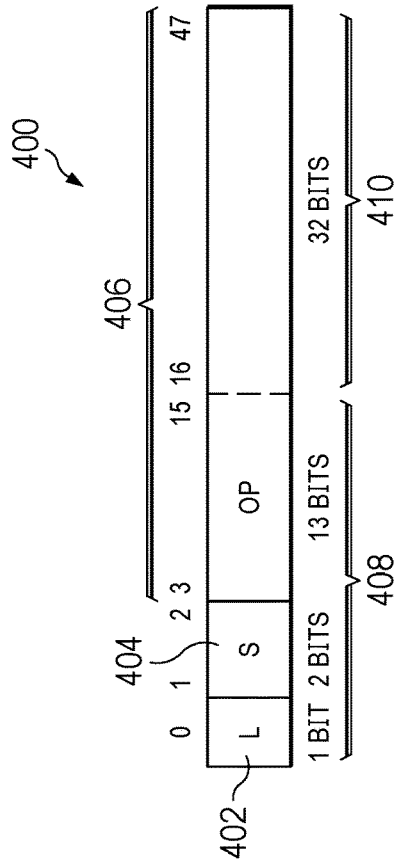
FIG. 3 is a block diagram illustrating a 32-bit CPU instruction according to an example.

FIG. 3 illustrates a CPU instruction 300 having a 32-bit format and includes a link portion 302, a size portion 304, and an opcode portion 306. Link portion 302 and size portion 304, similar to link portion 202 and size portion 204 of instruction 200, respectively indicate whether additional instructions follow and indicate the size of the instruction 300. Opcode portion 306 occupies 29 bits in the 32-bit instruction 300. As illustrated in FIG. 3, the first 13 bits of the opcode portion 306 together with the link portion 302 and size portion 304 form a primary portion 308 of the instruction 300. The remaining 16 bits of the opcode portion 306 not included in the primary portion 308 form a secondary portion 310 of the instruction 300.

Figure 4:
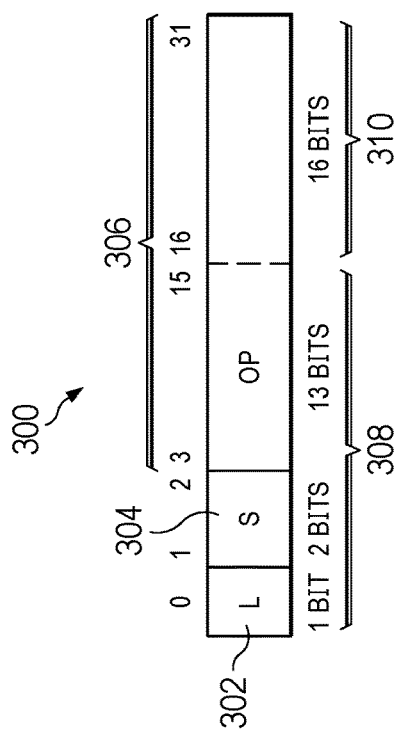
FIG. 4 is a block diagram illustrating a 48-bit CPU instruction according to an example.

FIG. 4 illustrates a CPU instruction 400 having a 48-bit format and includes a link portion 402, a size portion 404, and an opcode portion 406. Link portion 402 and size portion 404, similar to link portion 202 and size portion 204 of instruction 200, respectively indicate whether additional instructions follow and indicate the size of the instruction 400. Opcode portion 406 occupies 45 bits in the 48-bit instruction 400. As illustrated in FIG. 4, the first 13 bits of the opcode portion 406 together with the link portion 402 and size portion 404 form a primary portion 408 of the instruction 400. The remaining 32 bits of the opcode portion 406 not included in the primary portion 408 form a secondary portion 410 of the instruction 400.

Referring to FIGS. 1-4, the machine instruction set 112 includes at least one instruction having a format based on one of the instructions 200, 300, and 400. In a machine instruction set 112 with many instructions, however, the formats of two or of all three instructions 200, 300, and 400 may be represented. The machine instruction set 112 may include multiple, distinct instructions of one or more of the formats of the instructions 200, 300, and 400 so that there may be one or more 16-bit instructions (based on instruction 200), one or more 32-bit instructions (based on instruction 300), and/or one or more 48-bit instructions (bsed on instruction 400) in the set 112. Furthermore, the bit lengths in machine instruction set 112 are not restricted to the 16-, 32-, or 48-bit examples provided herein but could include bit lengths of any size.

As stated above, the first 13 bits of the opcode portions 206, 306, 406 of the instructions 200, 300, 400 form the primary portions 208, 308, 408 together with the respective link portions 202, 302, 402 and size portions 204, 304, 404. These first 13 bits include instructions for which a reduction in the amount of time needed to identify, decode, and send the bits on for further processing leads to an increase in CPU speed and performance That is, the quicker the 13 bits can be identified, decoded, and processed, the faster the CPU can operate. Any remaining bits of the instruction in the secondary portion do not need to be decoded as part of the decoding process in order to determine where the instruction needs to be routed (e.g., to a particular functional unit 108). Instead, the secondary portion information can be provided to the respective functional unit for carrying out the instruction without spending time decoding the secondary portion. In this manner, the processor 100 avoids decoding the secondary portion when decoding the instructions 200, 300, 400 to determine where to dispatch the instructions 200, 300, 400.

Figure 5:
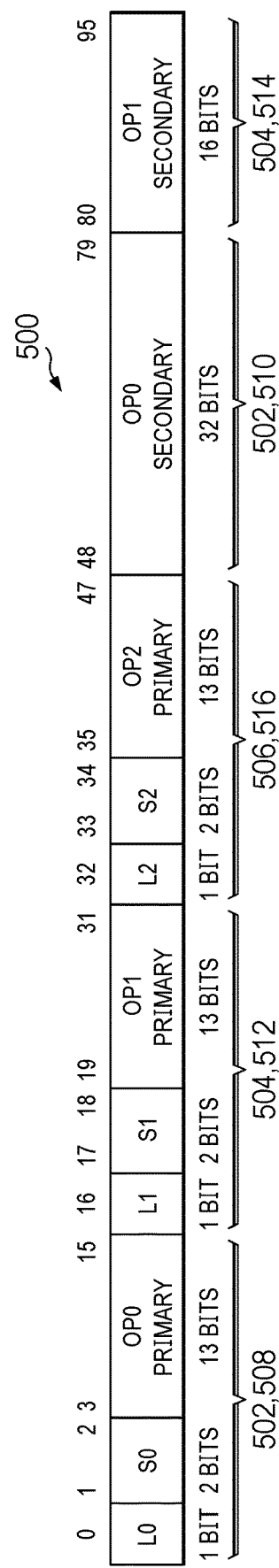
FIG. 5 is a block diagram illustrating an instruction packet of multiple instructions according to an example.

FIG. 5 is a diagram illustrating an example multi-instruction packet 500 of multiple instructions according to an example. Multi-instruction packet 500 includes three instructions selected from the machine instruction set 112 and includes a first, 48-bit instruction 502, a second, 32-bit instruction 504, and a third, 16-bit instruction 506. As shown, instruction 502 is split into two segments: a primary segment 508 at the beginning of the multi-instruction packet 500 and a secondary segment 510 following the instruction 506. Instruction 504 is also split into two segments: a primary segment 512 following the primary segment 508 of instruction 502 and a secondary segment 514 following the secondary segment 510 of instruction 502. Finally, the instruction 506 includes a primary segment 516 following the primary segment 512 of instruction 504. Because instruction 506 is a 16-bit instruction, no additional segment for secondary opcode is included in the multi-instruction packet 500. While the example multi-instruction packet 500 illustrated in FIG. 5 includes three instructions, instruction packets including one or more instructions in the packet are also contemplated.

Figure 6:
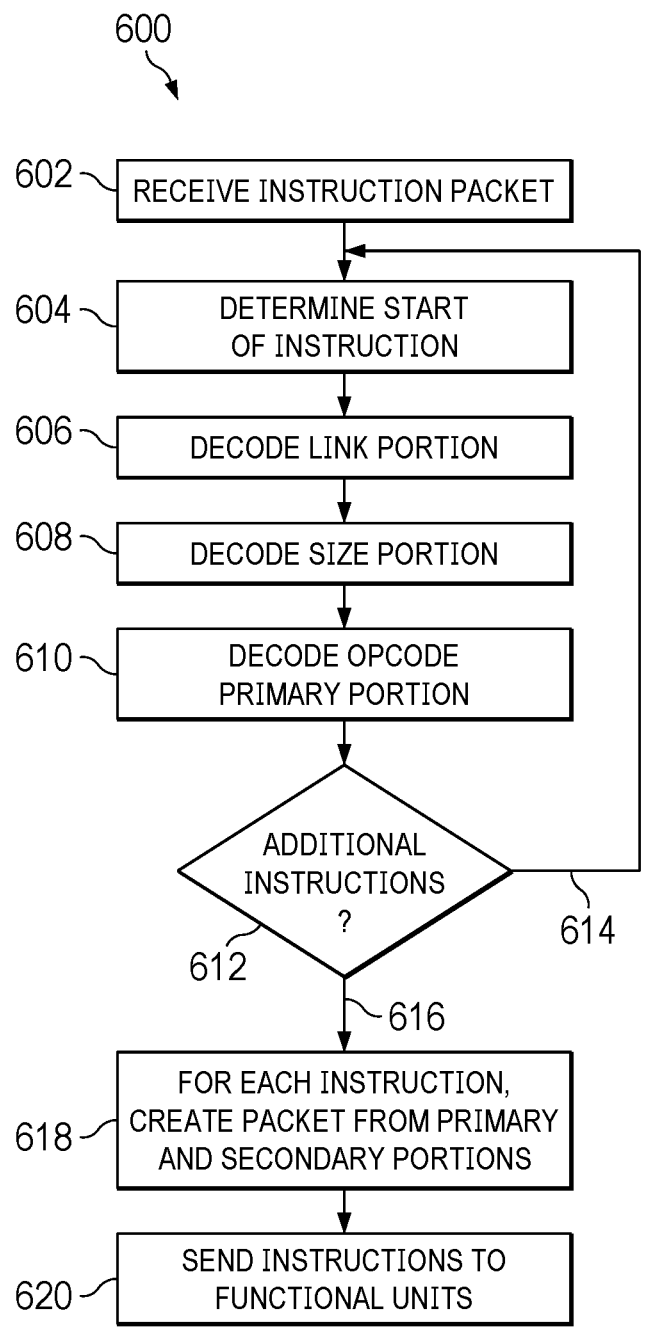
FIG. 6 is a flowchart of a decoding scheme according to an example.

FIG. 6 is a flowchart illustrating a decoding technique 600 executable by a decoder (e.g., decoder 106 of FIG. 1) according to an example. Referring to FIGS. 5 and 6, the multi-instruction packet 500 is received from, for example, the instruction buffer 104 at step 602. As illustrated in FIG. 5, the primary segments 508, 512, 516 are positioned back-to-back at the beginning of the multi-instruction packet 500. According to examples, the primary segments of every instruction in a multi-instruction packet are positioned back-to-back at the beginning of the instruction packet followed by any secondary segments. At step 604, the start of the first or next instruction is determined. When executed for the first time, an instruction start flag can indicate that the next instruction to be evaluated and decoded begins at bit 0. At step 606, the link portion of the first instruction 502 (the link portion corresponding to, for example, link portion 402 illustrated in FIG. 4) labelled as "L0" in FIG. 5 is accessed and decoded based on the instruction start flag to determine whether additional instructions follow the instruction. Because the first instruction 502 is not the only instruction in the example illustrated in FIG. 5, the link portion will indicate that at least one additional instruction follows. Such indication may be indicated, for example, by a value of 0b1. Next, the size portion of the first instruction 502 (the size portion corresponding to, for example, size portion 404 illustrated in FIG. 4) labelled as "S0" in FIG. 5 is accessed and decoded at step 608. Knowing where the link portion L0 is located, the size portion is known to be the following two bits, for example. Since the primary portion or segment 508 of instruction 502 comprises the 13 bits following the size portion S0, the opcode primary portion of the first instruction 502 (the opcode portion corresponding to, for example, opcode portion 406 illustrated in FIG. 4) labelled as "OP0 Primary" in FIG. 5 is accessed and decoded at step 610.

Since for the first, 48-bit instruction 502 there exists an additional 32 bits of operational code in the secondary portion 510, the decoder 106 knows that additional opcode bits for instruction 502 are to be found in the multi-instruction packet 500. However, acquisition of this additional opcode is deferred until after all primary segments have been decoded so that processing time can be reduced, thus increasing CPU speed and performance.

At step 612, technique 600 determines whether additional instructions follow the recently decoded instruction in the current instruction packet based at least in part on the link portion of the recently decoded instruction. In the example illustrated in FIG. 5, at least instructions 504 and 506 follow instruction 502. Accordingly, since additional instructions follow 614, technique 600 returns to step 604 to begin decoding of the next instruction. Since each primary segment 508, 512, 516 is 16 bits long, the decoder (e.g., decoder 106 of FIG. 1) knows that the next instruction begins 16 bits after the link portion of the previous instruction. As such, determination of the start of the next instruction involves adding 16 to the start of the previous instruction. In this manner, CPU processing operations used to determine the start bit of the subsequent instruction based on the size of the previous instruction (e.g., the subsequent instruction does not begin at a fixed location) can be avoided.

In the example illustrated in FIG. 5, the second instruction 504 begins at bit 16. Accordingly, without basing determination of the start of instruction 504 on the size of the first instruction 502, the link portion L1 can be read (step 606) at the starting bit location, the size portion S1 can be read (step 608) at the two bits following the starting bit location L1, and the opcode portion OP2 can be read (step 610) at the 13 bits following the size portion S1. Thus, without using an operationally costly method to determine the start of instruction 504 based on the size of the previous instruction, instruction 504 can be quickly identified and subsequently decoded. As with instruction 502, instruction 504 includes additional opcode in the secondary segment 514, and acquisition of this additional opcode is deferred until after all primary segments have been decoded.

Since the third instruction 506 follows the second instruction 504, the link portion L1 of the second instruction 504 will indicate that at least one additional instruction follows the second instruction 504. Accordingly, the technique 600 returns (614) again to step 604 to decode the third instruction 506 following the steps outlined above in steps 604-610.

Following the decoding of the third instruction 506, the determination (at step 612) whether additional instructions follow will indicate that the third instruction 506 was the last instruction. Accordingly, technique 600 moves 616 to step 618 to create a complete instruction packet for each instruction 502, 504, 506. In the case of instructions 502, 504, their primary and secondary portions are joined. That is, based on the decoded size portion 204, 304, 404, technique 600 can determine the length of any secondary portion 310, 410 to be joined with their respective primary portions 308, 408. At step 620, the generated instruction packets are sent to the appropriate functional units 108 by, for example, the dispatch unit 118 (FIG. 1).

Multi-instruction packets such as those described herein include instructions that are to be carried out in parallel or substantially simultaneously. The size of the instruction buffer 104 (FIG. 1) may, however, be larger than a particular multi-instruction packet. For example, the instruction buffer 104 may be a 128-bit register capable of holding, for example, a single, 128-bit multi-instruction packet. In another example, instruction buffer 104 may hold eight single-instruction 16-bit packets. Examples contemplate that the size of the instruction buffer 104 may be more or less than 128 bits. If less than all bits of the instruction buffer 104 are used for one single- or multi-instruction packet, the packet size calculation unit 120 (FIG. 1) can keep track of and identify where the most recent single- or multi-instruction packet ends and/or where a next single- or multi-instruction packet may start. The decode logic 116 (FIG. 1) may investigate the remaining portion of the instruction buffer 104 following each successfully decoded single- or multi-instruction packet to determine, for example, if the second and third bits following the last decoded single- or multi-instruction packet contain a size indicator, suggesting whether an additional instruction packet follows. If such additional instructions follow, then the decoder 106 (FIG. 1) may decode the next instruction packet (sent together with the previous instruction packet) without the instruction buffer 104 needing to be re-loaded with the next instruction packet from memory storage.

Additional timing savings can be accomplished by ensuring that the placement or ordering of the instructions in each multi-instruction packet is by size. For example, encoding each packet such that the instruction sizes follow a largest-to-smallest size can reduce decoding time. A table of example packet encoding is shown below.

TABLE 1

|     | I0      | I1      | I2      | I3      | I4      | I5      | I6      | I7      |
| --- | ------- | ------- | ------- | ------- | ------- | ------- | ------- | ------- |
| P1  | 48 bits | 48 bits | 32 bits |         |         |         |         |         |
| P2  | 48 bits | 48 bits | 16 bits | 16 bits |         |         |         |         |
| P3  | 48 bits | 32 bits | 32 bits | 16 bits |         |         |         |         |
| P4  | 48 bits | 32 bits | 16 bits | 16 bits | 16 bits |         |         |         |
| P5  | 48 bits | 16 bits | 16 bits | 16 bits | 16 bits | 16 bits |         |         |
| P6  | 32 bits | 32 bits | 32 bits | 32 bits |         |         |         |         |
| P7  | 32 bits | 32 bits | 32 bits | 16 bits | 16 bits |         |         |         |
| P8  | 32 bits | 32 bits | 16 bits | 16 bits | 16 bits | 16 bits |         |         |
| P9  | 32 bits | 16 bits | 16 bits | 16 bits | 16 bits | 16 bits | 16 bits |         |
| P10 | 16 bits | 16 bits | 16 bits | 16 bits | 16 bits | 16 bits | 16 bits | 16 bits |

For each instruction in Table 1, an example of the ordering of instructions (I0 up to I7) in various instruction packets (P1-P10) occupying all bits of a 128-bit instruction buffer is shown according to an example. When ensuring that the order of the possible instructions (I0-I7) in each packet is largest-to-smallest, it is possible to reduce CPU decoding time based on encountering a 16-bit instruction in a particular packet. For example, in instruction packet P2 of Table 1, a first 16-bit instruction is encountered at instruction I2. Since the instructions are in length order of largest-to-smallest, the decoding technique 600 can know that any subsequent instructions in the same instruction packet are also 16 bits and, therefore, does not need to decode the size portion of any subsequent instruction. Accordingly, for instruction packet P2, the decoding of instruction I3 can skip the decoding of its size. Similarly, instruction packets P4-P5 and P7-P10 can forgo decoding of the size of the instructions after the first 16-bit instruction is identified.

While instruction packets (P1-P10) in Table 1 illustrate using all 128-bits (or all bits of the instruction buffer 104), other instruction packets not using all 128 bits may be transferred from the instruction buffer. For example, an instruction packet may include a 48-bit instruction followed by three 16-bit instructions. The packet encoding scheme above, however, also works for these packets not using all 128 bits. That is, after a 16-bit instruction is found, the decoding of each subsequent instruction can skip decoding the instruction's size.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A processor comprising:
a core;
wherein the core is configured to perform a decode operation on a multi-instruction packet comprising multiple instructions, the decode operation comprising:
receiving the multi-instruction packet that includes:
a first instruction that includes a primary portion at a fixed first location and a secondary portion; and
a second instruction that includes a primary portion at a fixed second location between the primary portion of the first instruction and the secondary portion of the first instruction;
accessing the primary portion of the first instruction;
decoding an operational code (opcode) portion of the primary portion of the first instruction;
accessing the primary portion of the second instruction;
decoding an opcode portion of the primary portion of the second instruction;
creating a first instruction packet comprising the primary portion of the first instruction and the secondary portion of the first instruction;
creating a second instruction packet comprising the primary portion of the second instruction;
dispatching the first instruction packet to a first functional unit; and
dispatching the second instruction packet to a second functional unit distinct from the first functional unit.

2. The processor of claim 1, wherein dispatching the first instruction packet to the first functional unit comprises dispatching the first instruction packet to the first functional unit based on the decoded opcode portion of the primary portion of the first instruction.

3. The processor of claim 1, wherein the dispatching of the first instruction by the core avoids decoding the secondary portion of the first instruction.

4. The processor of claim 1, wherein creating the second instruction packet further comprises creating the second instruction packet comprising a secondary portion of the second instruction located after the secondary portion of the first instruction within the multi-instruction packet.

5. The processor of claim 1, wherein the decode operation further comprises:
accessing a primary portion of a third instruction in the multi-instruction packet, the primary portion of the third instruction located at a fixed third location within the multi-instruction packet; and
decoding an opcode portion of the primary portion of the third instruction;
wherein the fixed third location is after the fixed second location and before the secondary portion of the first instruction within the multi-instruction packet.

6. The processor of claim 5, wherein the decode operation further comprises creating a third instruction packet comprising the primary portion of the third instruction;
wherein a number of bits of the first instruction packet is greater than or equal to a number of bits of the second instruction packet; and
wherein a number of bits of the third instruction packet is equal to the number of bits of the second instruction packet.

7. The processor of claim 5, wherein the decode operation further comprises creating a third instruction packet comprising the primary portion of the third instruction;
wherein a number of bits of the first instruction packet is greater than or equal to a number of bits of the second instruction packet; and
wherein a number of bits of the third instruction packet is less than the number of bits of the second instruction packet.

8. The processor of claim 1, wherein a number of bits of the primary portion of the first instruction is equal to a number of bits of the primary portion of the second instruction.

9. The processor of claim 8, wherein the number of bits of the first instruction packet comprises at least 32 bits; and
wherein the number of bits of the second instruction packet comprises at least 16 bits.

10. The processor of claim 1, wherein the decode operation further comprises:
decoding a link portion of the primary portion of the second instruction; and
determining whether an additional instruction exists within the multi-instruction packet after the second instruction based on the decoded link portion.

11. A method implemented on a processor core, the method comprising:
receiving a first multi-instruction packet that includes:
a primary portion of a first instruction at a fixed first location;
a primary portion of a second instruction at a fixed second location that follows the fixed first location; and
a secondary portion of the first instruction that follows the primary portion of the second instruction;
decoding an operational code ("opcode") portion of the primary portion of the first instruction;
decoding an opcode portion of the primary portion of the second instruction;
accessing the secondary portion of the first instruction;
creating a first instruction packet comprising the primary and secondary portions of the first instruction; and
respectively dispatching the first instruction packet and the second instruction to distinct functional units.

12. The method of claim 11, wherein dispatching the first instruction packet and the second instruction to distinct functional units comprises dispatching the first instruction packet and the second instruction to distinct functional units in parallel.

13. The method of claim 11, wherein a size of the first instruction packet is one of 48 bits, 32 bits, and 16 bits; and
wherein:
if the size of the first instruction packet is 48 bits, a size of a second instruction packet comprising the second instruction is one of 48 bits, 32 bits, and 16 bits;
if the size of the first instruction packet is 32 bits, the size of the second instruction packet is one of 32 bits, and 16 bits; and
if the size of the first instruction packet is 16 bits, the size of the second instruction packet is 16 bits.

14. The method of claim 13 further comprising decoding a size portion of the primary portion of the first instruction to determine the size of the first instruction packet.

15. The method of claim 14 further comprising decoding a size portion of the secondary portion of the second instruction to determine the size of the second instruction only if the size of the first instruction packet is more than 16 bits.

16. The method of claim 11 further comprising:
   accessing a secondary portion of the second instruction located after the secondary portion of the first instruction within the first multi-instruction packet; and
   creating a second instruction packet comprising the primary and secondary portions of the secondary instruction.

17. The method of claim 16 further comprising decoding an opcode portion of a primary portion of a third instruction in the first multi-instruction packet, the primary portion of the third instruction located at a fixed third location within the first multi-instruction packet after the fixed second location and before the secondary portion of the first instruction.

18. The method of claim 11 further comprising receiving the first multi-instruction packet into an instruction buffer from computer memory.

19. The method of claim 18, wherein a size of the instruction buffer is 128 bits.

20. The method of claim 18 further comprising determining whether a second multi-instruction packet exists in the instruction buffer following the first multi-instruction packet if a size of the first multi-instruction packet is less than the size of the instruction buffer.

* * * * *